K. McCLAIRE.

CURLER.

APPLICATION FILED MAR. 3, 1922.

Reissued May 23, 1922. 15,363.

Witnesses:
Wm. Schnellhardt.
J. D. Stowe

Inventor:
Katherine McClaire
By Joshua R. H. Potts
Her Attorney

UNITED STATES PATENT OFFICE.

KATHERINE McCLAIRE, OF CHICAGO, ILLINOIS.

CURLER.

15,363. Specification of Reissued Letters Patent. Reissued May 23, 1922.

Original No. 1,397,532, dated November 22, 1921, Serial No. 476,081, filed June 8, 1921. Application for reissue filed March 3, 1922. Serial No. 540,882.

*To all whom it may concern:*

Be it known that I, KATHERINE McCLAIRE, a citizen of the United States, residing at Chicago, in the county of Cook and State of Illinois, have invented new and useful Improvements in Curlers, of which the following is a specification.

My invention relates to improvements in curlers, and has for its object the production of a device that will retain its shape when used for the purpose for which it is intended, and one that can be straightened readily after use.

A further object is the production of a device of simple construction, and one that is not liable to get out of order.

Figure 1:
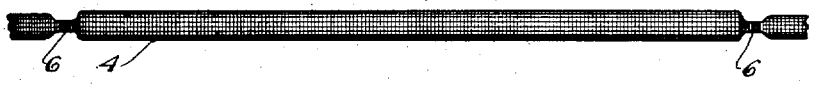
Figure 2:
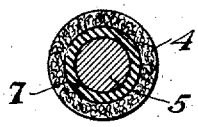
Figure 3:
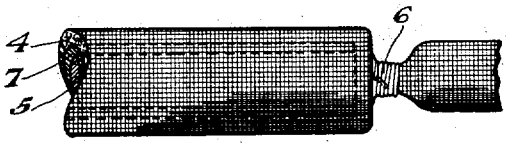

These and such other objects as may appear hereinafter are attained by my device, an embodiment of which is illustrated in the accompanying drawing, in which, Fig. 1 represents a perspective view of my device, Fig. 2 represents a sectional view of Fig. 1, and Fig. 3 represents an enlarged view of the end portion of my device.

Like numerals of reference indicate like parts in the several figures of the drawing.

Referring now to the drawings, my device comprises a flexible fibrous tube or envelop 4, within which is positioned a large wire or rod 5, preferably of copper, completely filling the tube, the ends of the tube being confined, as shown at 6, to hold the rod in place. The tube may also be provided with a pliable inner lining 7, immediately surrounding the wire, as clearly shown in Fig. 2. The fibrous envelop or tube is slightly longer than the rod, and the ends secured preferably by a thread or string wound tightly around the ends and preferably sewed through the end, thus preventing any chance of the rod being withdrawn. The copper rod is very soft grade, so as to be very flexible and assume any shape to which it may be bent in using the device, and so that it can be straightened out and made to assume its original position without danger of breaking.

Heretofore tubes have been employed with a plurality of wires therein, but much difficulty has been experienced in the wires breaking and forcing the ends through the fiber envelop, or in the original ends of the wire coming through and scratching the user. In the form in common use, it is difficult, often, to straighten the devices and pull them from the hair without either catching the hair or causing it to snarl. My device, however, can be pressed straight and slipped out of the hair without difficulty or interference.

By the use of a single rod or large wire, all this objection is eliminated, and an article of great use and value produced.

I am not limiting myself to copper, as there are other metals and materials having a proper degree of flexibility that will serve the purpose.

Having described my invention, what I claim as new and desire to secure by Letters Patent is:

1. A curler comprising a bar of soft copper of substantial size, circular in shape, a tube of flexible material surrounding said bar, the ends of said tube stitched together and securely tied and said ends extending beyond the stitched portion.

2. A curler comprising an integral bar of soft copper of substantial size and circular in shape, a tube of flexible material within which said bar is placed, the ends of said tube extending beyond the ends of said bar, thread being stitched through the ends of said tube adjacent to the ends of the bar, said thread being wound several times around said tube and drawn tightly to prevent the removal of said bar, the ends of said tube being extended beyond said confined portion.

3. A curler comprising a bar of soft metal, an outside tube of flexible material containing said bar, and separate means to engage each end of said tube to fasten said tube together beyond each end of said bar, entirely inclosing and confining the bar.

4. A curler comprising a rod of flexible metal, a tubular casing of flexible material covering said rod and engaging the ends thereof, and means for engaging and securing said flexible material together immediately beyond each end of said rod for entirely enclosing and retaining the rod.

5. A curler comprising a rod of pliable metal, a tube of flexible material forming the outer covering for said rod and extending beyond the ends thereof, and means for engaging and securely drawing and fastening said flexible material together at the outer ends of said rod.

6. A curler comprising a rod of pliable metal, a tube of flexible material covering said rod and extending beyond the ends thereof, said tube being reduced in size and securely tied together inward of its ends and at the outer ends of said rod, entirely enclosing said rod.

7. A curler comprising a rod of pliable metal, a tube of fibrous material covering said rod and extending beyond the ends thereof, said tube being reduced in size and securely fastened together immediately beyond the ends of said rod entirely enclosing the rod, the ends of said tube being spread outward beyond said confined portion.

8. A curler comprising an integral rod of soft copper, a tube of flexible material surrounding said rod and extending beyond the ends thereof, and pliable means fastened around said tube drawing it tightly together at the outer ends of said rod to prevent removal of the rod, the ends of said tube extending beyond said confined portions.

In testimony whereof I have signed my name to this specification in the presence of two subscribing witnesses.

KATHERINE McCLAIRE.

Witnesses:

FREDA C. APPLETON,
JOSHUA R. H. POTTS.